(12) United States Patent
Suzuki

(10) Patent No.: US 8,517,071 B2
(45) Date of Patent: Aug. 27, 2013

(54) PNEUMATIC TIRE

(75) Inventor: Takayuki Suzuki, Kanagawa-ken (JP)

(73) Assignee: The Yokohama Rubber Co., Ltd. (JP)

( * ) Notice: Subject to any disclaimer, the term of this patent is extended or adjusted under 35 U.S.C. 154(b) by 845 days.

(21) Appl. No.: 12/579,146

(22) Filed: Oct. 14, 2009

(65) Prior Publication Data

US 2010/0096060 A1  Apr. 22, 2010

(30) Foreign Application Priority Data

Oct. 16, 2008 (JP) ................................. 2008-267720
Sep. 24, 2009 (JP) ................................. 2009-218845

(51) Int. Cl.
*B60C 9/18* (2006.01)
*B60C 11/03* (2006.01)

(52) U.S. Cl.
USPC ..................................... 152/209.27; 152/538

(58) Field of Classification Search
USPC ........................................... 152/209.27, 538
See application file for complete search history.

(56) References Cited

U.S. PATENT DOCUMENTS 5,131,446 A * 7/1992 Fukumoto et al. ............ 152/538
6,488,064 B1  12/2002 Radulescu

FOREIGN PATENT DOCUMENTS

| JP | 63-134313 A | * | 6/1988 |
| JP | H4-266503 A | | 9/1992 |
| JP | 05-185809 A | * | 7/1993 |
| JP | 78422 | | 3/1999 |
| JP | 2002-316514 A | | 10/2002 |
| JP | 2006-248391 | | 9/2006 |

OTHER PUBLICATIONS

Translation for Japan 63-134313 (no date).*

* cited by examiner

*Primary Examiner* — Steven D Maki

(74) *Attorney, Agent, or Firm* — Thorpe North & Western LLP

(57) ABSTRACT

A pneumatic tire wherein a distance t from an equatorial plane of a tire to outer circumferential main grooves and a distance b from the equatorial plane of the tire to an edge of a belt edge cushion in the width direction of the tire satisfy $0.85 \leq t/b \leq 0.90$, in a cross-section in a meridian direction of the tire. Moreover, a distance d, which is half the width of a belt ply having the largest width, and a distance u from the equatorial plane of the tire to narrow grooves, satisfy $0.97 \leq d/u \leq 1.03$. Furthermore, a distance a, which is half the width of a belt ply in the outermost layer, and a distance t, of outer circumferential main grooves, satisfy $1.15 \leq a/t \leq 1.25$.

20 Claims, 3 Drawing Sheets

|  | Comparative Examples | Invention Example 1 | Invention Example 2 | Invention Example 3 | Invention Example 4 | Invention Example 5 | Invention Example 6 | Invention Example 7 | Invention Example 8 | Invention Example 9 | Invention Example 10 |
|---|---|---|---|---|---|---|---|---|---|---|---|
| t/b | 0.85 | 0.85 | 0.9 | 0.9 | 0.9 | 0.9 | 0.9 | 0.88 | 0.88 | 0.88 | 0.88 |
| d/u | 0.95 | 0.97 | 1.03 | 1.03 | 1.03 | 1.03 | 1.03 | 1 | 1 | 1 | 1 |
| a/t | 1 | 1.15 | 1.25 | 1.25 | 1.25 | 1.25 | 1.25 | 1.25 | 1.2 | 1.2 | 1.2 |
| s/u | 0.19 | 0.18 | 0.2 | 0.2 | 0.2 | 0.2 | 0.2 | 0.2 | 0.19 | 0.19 | 0.19 |
| t/u | 0.58 | 0.58 | 0.58 | 0.58 | 0.58 | 0.58 | 0.58 | 0.58 | 0.58 | 0.58 | 0.58 |
| D1/D2 | 0.33 | 0.33 | 0.33 | 0.35 | 0.4 | 0.4 | 0.4 | 0.4 | 1.4 | 0.38 | 0.38 |
| D2/D3 | 0.8 | 0.8 | 0.8 | 0.85 | 1 | 1 | 1 | 1 | 1 | 0.9 | 0.95 |
| G2/G1 | 1 | 0.7 | 0.7 | 0.7 | 0.7 | 0.8 | 1 | 1 | 1 | 1 | 0.9 |
| Uneven wear | 100 | 110 | 110 | 120 | 120 | 130 | 130 | 140 | 145 | 155 | 160 |

FIG. 3

PNEUMATIC TIRE

PRIORITY CLAIM

Priority is claimed to Japan Patent Application Serial No. JP2008-267720A filed on Oct. 16, 2008 and Japan Patent Application No. JP2009-218845 filed on Sep. 24, 2009, which are incorporated herein by reference in their entirety.

TECHNICAL FIELD

The present invention relates to a pneumatic tire, and more specifically, to a pneumatic tire having improved uneven-wear resistance.

BACKGROUND

In pneumatic tires made in recent years, narrow ribs are provided on an outer side of a footprint edge in the tire width direction. These narrow ribs are so-called abrasion sacrifice ribs, and by proactively taking on abrasion when the tire is rolling, reduce uneven wear of the shoulder rib overall. The technology described in Kokai JP-A-11-78422 is known as a conventional pneumatic tire using this manner of construction.

Patent Document 1: Japanese Patent Publication (A) No. 11-78422

DISCLOSURE OF THE INVENTION

Problem to be Solved by the Invention

An object of the present invention is to provide a pneumatic tire having improved uneven-wear resistance.

SUMMARY OF THE INVENTION

To achieve the above object, the pneumatic tire according to the present invention is formed by laminating a plurality of belt plies. Additionally, the pneumatic tire has a belt layer that is arranged on an outer side of a carcass layer in a tire radial direction and a belt edge cushion that is arranged on an edge of the belt plies. The pneumatic tire has, in its tread, at least four circumferential main grooves extending in the radial direction of the tire, a plurality of land portions (ribs) partitioned and formed by these circumferential main grooves, and narrow grooves that form narrow ribs, on an edge of the outer side of the land portions in the width direction of the tire, arranged on the land portion of the tread shoulder area. The left and right circumferential main grooves, of the circumferential main grooves, located on the edge sides of the tire footprint are called outer circumferential main grooves. In a cross-section in the tire meridian direction, the pneumatic tire has a distance t from the tire equatorial plane to the outer circumferential main grooves and a distance b from the tire equatorial plane to the edge on in the inner side of the belt edge cushion in the tire width direction that satisfy $0.85 \leq t/b \leq 0.90$; a width d, which is half the width of the belt ply that has the largest width and a distance u from the tire equatorial plane to the narrow grooves that satisfy $0.97 \leq d/u \leq 1.03$; and a width a, which is half the width of the belt ply in the outermost layer and the distance t, namely that of the distance to the outer circumferential main grooves, that satisfy $1.15 \leq a/t \leq 1.25$.

This pneumatic tire has a ratio t/b, where t is the distance from the equatorial plane of the tire to the outer circumferential main grooves and b is the distance from the equatorial plane of the tire to the inner edge of the belt edge cushion in the tire width direction, a ratio d/u, where d is half the width of the belt ply with the largest width and u is the distance from the equatorial plane of the tire to narrow grooves $53$, as well as a ratio a/t, where a is half the distance of the belt ply in the outermost layer and t is the abovementioned distance. With this structure, the positional relationship between the tread grooves and the belt layer (belt ply), and the positional relationship between grooves are such that variations in the tread gauge attributed to tire manufacturing accuracy are mitigated. This leads to the advantage that the uneven-wear resistance of the tire improves.

Additionally, the pneumatic tire according to the present invention has circumferential main grooves located on the tire's equatorial plane that are called inner circumferential main grooves. The relationship whereby a distance s from the equatorial plane of the tire to these inner circumferential main grooves, and a distance u, which is that of the narrow grooves satisfy $0.18 \leq s/u \leq 0.20$.

In this pneumatic tire, the structure has a positional relationship between the inner circumferential main grooves and the narrow grooves such that variations in the tread gauge attributed to tire manufacturing accuracy are further mitigated. This leads to the advantage that the uneven-wear resistance of the tire further improves.

Moreover, the pneumatic tire according to the present invention has a relationship whereby a distance t of the outer circumferential main grooves and a distance u of the narrow grooves are such that $0.55 < t/u \leq 0.60$.

With this pneumatic tire, the positional relationship between the outer circumferential main grooves and the narrow grooves is made appropriate. Therefore variations in the tread gauge attributed to tire manufacturing accuracy are further reduced. This leads to the advantage that the uneven-wear resistance of the tire further improves.

Moreover, the pneumatic tire according to the present invention may have belt plies (subsequently referred to as intermediate belt plies) which are arranged between the belt plies in the outermost layer and the belt plies that have the largest width. These belt plies have a relationship such that a distance D1 from the groove floor of the outer circumferential grooves to the belt plies in the outermost layer, a distance D2 from the groove floor of the narrow grooves to the edge of the intermediate belt plies on the tire width direction side, and a distance D3 from the groove floor of the narrow grooves to the belt plies that have the largest width satisfy $0.35 \leq D1/D2 \leq 0.40$ and $0.85 \leq D2/D3 \leq 1.00$.

With this pneumatic tire, the positional relationship between each groove in the tread shoulder region and each belt ply is made appropriate. Therefore, tread gauge fluctuations in the belt edge cushion vicinity when the tire is rolling are mitigated. This leads to the advantage that the uneven-wear resistance of the tire further improves.

Moreover, the pneumatic tire according to the present invention has a relationship such that a groove depth G1 of the outer circumferential main grooves and a groove depth G2 of the narrow grooves satisfy $0.8 \leq G2/G1 \leq 1.00$.

With this pneumatic tire, the ratio G2/G1 between groove depth G1 of the outer circumferential main grooves and groove depth G2 of the narrow grooves is made appropriate. Therefore tread gauge fluctuations in the belt edge cushion vicinity when the tire is rolling are mitigated. This leads to the advantage that the uneven-wear resistance of the tire further improves.

Moreover, the pneumatic tire according to the present invention has a structure wherein a center area of the land portions in the tread shoulder region is sipeless.

With this pneumatic tire, because the center area of the shoulder ribs is not segmented by sipes, the rigidity of the shoulder ribs is ensured. This leads to the advantage that the uneven-wear resistance of the tire improves.

Additionally, according to still another aspect of the present invention, the pneumatic tire is applied to a heavy-duty pneumatic tire.

With heavy-duty pneumatic tires, high loads are applied, so it is easy for uneven wear to occur. Hence, by targeting these heavy-duty pneumatic tires for application, there is the advantage that even more remarkable resistance to uneven wear can be achieved.

Effect of the Invention

With the pneumatic tire according to the present invention a ratio t/b, where t is the distance from the equatorial plane of the tire to the outer circumferential main grooves and b is the distance from the equatorial plane of the tire to the inner edge of the belt edge cushion in the tire width direction is made appropriate. Further, a ratio d/u, where d is half the width of the belt ply with the largest width and u is the distance from the equatorial plane of the tire narrow grooves 53, and, and additionally, a ratio a/t, where a is half the distance of the belt ply in the outermost layer and t is the abovementioned distance, are also made appropriate. With this structure, the positional relationship between the tread grooves of the belt layer (belt ply), and the positional relationship between grooves are appropriate to mitigate variations in the tread gauge attributed to tire manufacturing accuracy. This leads to the advantage that the uneven-wear resistance of the tire improves.

BRIEF DESCRIPTION OF THE DRAWINGS

FIG. 3 is a table indicating test results of performance tests of pneumatic tires according to the embodiment of the present invention.

DESCRIPTION OF THE PREFERRED EMBODIMENTS

The present invention is explained in detail below with reference to the drawings. However, the present invention is in no way limited by the embodiments. Moreover, structural elements of the present embodiments which can possibly or obviously be substituted while maintaining consistency with the present invention are included. Additionally, the various modifications disclosed in the embodiments can be arbitrarily combined within the range obvious to those skilled in the art.

Embodiments

Figure 1:
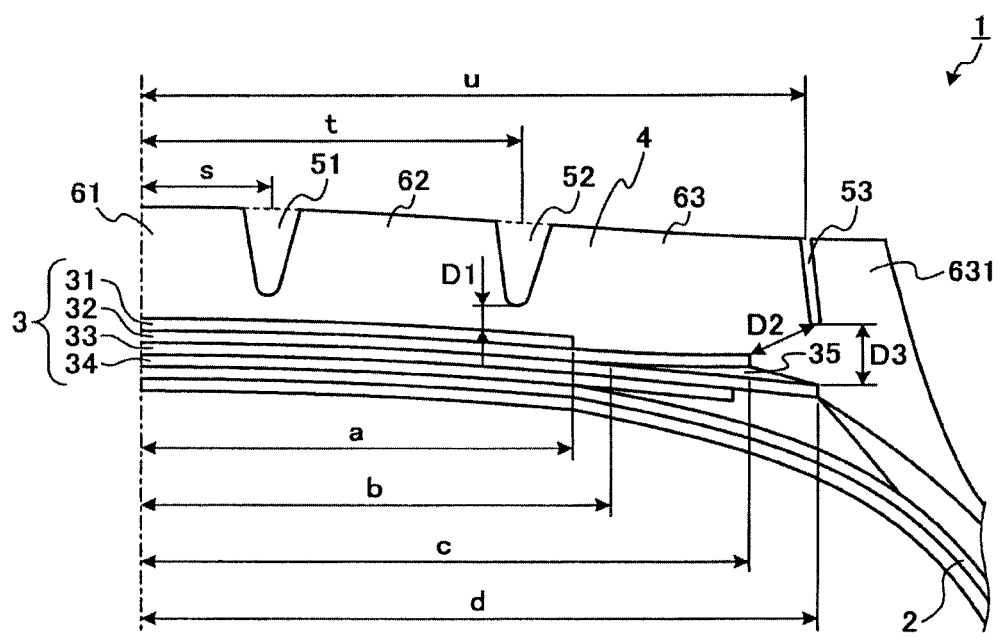
FIG. 1 is a cross section of a pneumatic tire in a meridian direction of a tire according to an embodiment of the present invention.
Figure 2:
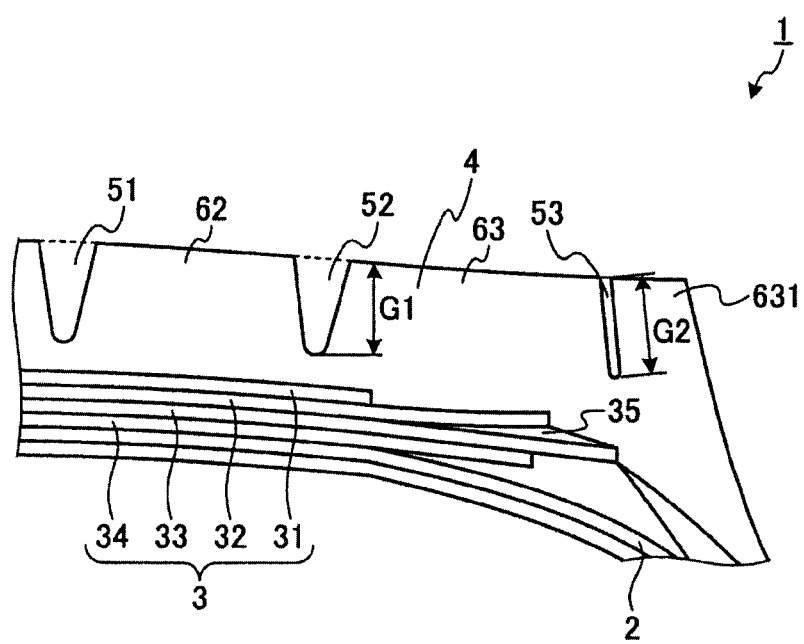
FIG. 2 is an explanatory view depicting a modified example of the pneumatic tire shown in FIG. 1.

FIG. 1 is a cross section of a pneumatic tire in a tire meridian direction according to an embodiment of the present invention. FIG. 2 is an explanatory view of a modified example of the pneumatic tire shown in FIG. 1. FIG. 3 is a table indicating the results of performance testing of the pneumatic tire according to the embodiment of the present invention.

[Pneumatic Tire]

A pneumatic tire 1 is constituted including a carcass layer 2, a belt layer 3, and tread rubber 4 (see FIG. 1). The carcass layer 2 stretches across left and right bead cores, in toroidal form (not shown in the figure), forming a framework for the tire. The belt layer 3 is formed from a plurality of belt plies 31 to 34 that are laminated, and is arranged in a radial direction the tire on a periphery of the carcass layer 2. The tread rubber 4 is arranged in a radial direction of the tire on the periphery of the carcass layer 2 and the belt layer 3, and constitutes a tire tread.

Additionally, the pneumatic tire 1 has a plurality of circumferential main grooves 51, 52, extending in the circumferential direction of the tire, and a plurality of land portions (ribs) 61 to 63, formed by the circumferential main grooves 51, 52 (see FIG. 1). For example, in this embodiment, two circumferential main grooves 51, 52 are respectively formed in left and right regions of the tread, which have an equatorial plane CL of the tire as a boundary. In other words, four circumferential main grooves 51, 52 are formed in the tread. Among the circumferential main grooves 51, 52, the two circumferential main grooves located on the equatorial plane CL side of the tire are called inner circumferential main grooves 51, and the left and right circumferential main grooves located on the tire footprint edge sides are called outer circumferential main grooves 52. Three center ribs 61, 62 are formed in the center region of the tread by the circumferential main grooves 51, 52, and shoulder ribs 63 are formed in the left and right shoulder regions of the tread respectively. In this way, a tread pattern with underlying ribs is formed.

Furthermore, the pneumatic tire 1 has narrow grooves 53 in shoulder rib 63 (see FIG. 1). The narrow grooves 53 are arranged along the road surface side of the tread, namely the edge of the tire width direction side of the shoulder rib 63 (in the vicinity of the footprint edge), and narrow ribs 631 are formed on an edge of the shoulder rib 63 (buttress). The narrow ribs 631 are so-called abrasion sacrifice ribs, and by proactively taking on abrasion when the tire is rolling, inhibit the overall abrasion on the shoulder rib 63.

Next, a belt edge cushion 35 is provided to pneumatic tire 1. The belt edge cushion 35 is arranged to be enclosed within the edges of the belt plies 32, 33 in the radial direction of the tire. For example, in the present embodiment, the belt edge cushion 35, which has a triangular cross-section shape, is arranged to be enclosed between the edge of the second belt ply 32 from the exterior of the tire in the radial direction and the edge of the third belt ply 33. Correspondingly, a distance t from the equatorial plane CL of the tire to the outer circumferential main grooves 52, and a distance b from the equatorial plane CL of the tire to the inner edge of belt edge cushion 35 in the tire's width direction satisfy $0.85 \leq t/b \leq 0.90$. Also, in a cross section in the tire meridian direction, a width d, which is half the width of the belt ply that has the largest width (the third belt ply from the tire exterior in the radial direction) and a distance u from the tire equatorial plane CL to the narrow grooves satisfy $0.97 \leq d/u \leq 1.03$. Moreover, a width a, which is half the width of the belt ply in the outermost layer, and a distance t, namely that from the tire equatorial plane CL to the outer circumferential main grooves, satisfy $1.15 \leq a/t \leq 1.25$.

In the present embodiment, measurements of belt ply half-widths a, c, and d, and distances b and s to u from the equatorial plane CL of the tire are conducted in a state where the tire has been attached to an application rim, the prescribed inner pressure has been applied, and there is no load. Furthermore, the distances s to u are distances to the center of the grooves.

"Application rim," as used herein, refers to the "Application Rim" defined by JATMA, "Design Rim" defined by TRA, or the "Measuring Rim" defined by ETRTO. The prescribed inner pressure includes the "maximum air pressure" defined by JATMA, the maximum value in "TIRE LOAD LIMITS AT VARIOUS COLD INFLATION PRESSURES" defined by TRA, or the "INFLATION PRESSURES" defined by ETRTO. The prescribed load includes the "maximum load capacity" defined by JATMA, the maximum value in "TIRE LOAD LIMITS AT VARIOUS COLD INFLATION PRESSURES" defined by TRA, or the "LOAD CAPACITY" defined by ETRTO. However, in the case of passenger car tires, the prescribed inner pressure is an air pressure of 180 kPa, and the prescribed load is a maximum load capacity of 88%.

[Effect]

As explained above, in the pneumatic tire 1, a ratio t/b, where t is the distance from the equatorial plane CL of the tire to the outer circumferential main grooves 52 and b is the distance from the equatorial plane of the tire CL to the inner edge of belt edge cushion 35 in the tire width direction is made appropriate Additionally, a ratio d/u, where d is half the width of the belt ply 33 with the largest width and u is the distance from the equatorial plane CL of the tire to narrow grooves 53, as well as a ratio a/t, where a is half the distance of the belt ply 31 in the outermost layer and t is the above-mentioned distance, are made appropriate (see FIG. 1). With this structure, because the positional relationship between the tread grooves 51 to 53 and the belt layer 3 (belt plies 31 to 34), and the positional relationship between the grooves 51 to 53 are appropriate, variations in the tread gauge attributed to tire manufacturing accuracy are mitigated. This leads to the advantage that the uneven-wear resistance of the tire improves.

[Modified Example]

In the pneumatic tire 1, it is preferable that the relationship between distance s from the equatorial plane CL of the tire to the inner circumferential grooves 51 and distance u from the equatorial plane CL of the tire to the narrow grooves 53, satisfy $0.18 \leq s/u \leq 0.20$ (see FIG. 1). Furthermore, because the positional relationship between the inner circumferential main grooves 51 and the narrow grooves 53 is made appropriate by this structure, variations in the tread gauge attributed to tire manufacturing accuracy are further mitigated. This leads to the advantage that the uneven-wear resistance of the tire further improves Moreover, in the pneumatic tire 1, it is preferable that a distance t of the outer circumferential main grooves 52 and a distance u of the narrow grooves 53 satisfy $0.55 \leq t/u \leq 0.60$ (see FIG. 1). With this structure, because the positional relationship between the outer circumferential main grooves 52 and the narrow grooves 53 is made appropriate, variations in the tread gauge attributed to tire manufacturing accuracy are further mitigated. This leads to the advantage that the uneven-wear resistance of the tire further improves.

Also, the belt ply 32, which is arranged to be enclosed between the belt ply 31 in the outermost layer and the belt ply 33 that has the largest width, is called an intermediate belt ply (see FIG. 1). Correspondingly, with this pneumatic tire, it is preferable that a distance D1 from the groove floor of the outer circumferential grooves 52 to the belt plies 31 in the outermost layer, a distance D2 from the groove floor of the narrow grooves 53 to the edge of the intermediate belt plies 32 on the tire width direction side, and a distance D3 from the groove floor of the narrow grooves 53 to the belt plies 33 that have the largest width, satisfy $0.35 \leq D1/D2 \leq 0.40$, and $0.85 \leq D2/D3 \leq 1.00$. With this structure, because the positional relationship between each groove 52, 53 in the tread shoulder region and each belt ply 31 to 33 is made appropriate, tread gauge fluctuations in the belt edge cushion 35 vicinity when the tire is rolling are mitigated. This leads to the advantage that the uneven-wear resistance of the tire further improves.

Moreover, in the pneumatic tire 1, it is preferable that a groove depth G1 of the outer circumferential main grooves 52 and a groove depth G2 of the narrow grooves 53 satisfy $0.8 \leq G2/G1 \leq 1.0$ (see FIG. 1). Because the ratio G2/G1 between groove depth G1 of the outer circumferential main grooves 52 and groove depth G2 of the narrow grooves 53 is made appropriate, tread gauge fluctuations in the belt edge cushion vicinity when the tire is rolling are mitigated. This leads to the advantage that the uneven-wear resistance of the tire further improves.

Moreover, in the pneumatic tire 1, it is preferable for the center area of the tread shoulder region land portions 63 to have a sipeless structure (not shown in the figure). In other words, it is preferable for sipes not to be formed at the center of the shoulder ribs 63 (the part excluding the edges). With this structure, the center of the shoulder ribs 63 is not segmented by sipes, so the rigidity of the shoulder ribs 63 is secured. This leads to the advantage that the uneven-wear resistance of the tire improves. Sipes refer to those sipes having a sipe depth of 5 mm or more, and a sipe width of 1 mm or more and 2 mm or less. Moreover sipes can be arranged at the edge of the shoulder ribs 63.

[Target of Application]

Moreover, it is preferable that the pneumatic tire 1 be applied to heavy-duty pneumatic tires. With heavy-duty pneumatic tires, high loads are applied, so it is easy for uneven wear to occur. Hence, by targeting these heavy-duty pneumatic tires for application, there is the advantage that the resistance of the tire to uneven wear can be more remarkably achieved.

Furthermore, with this pneumatic tire, the land portions 61-63 have a tread pattern with underlying ribs (not shown in the drawings). With this construction, the land portions 61-63 are contiguous in the circumferential direction of the tire, so the rigidity of the land portions 61-63 (particularly the shoulder rib 63) is suitably ensured. Therefore, there is an advantage that the resistance to uneven wear of the tire is enhanced.

However, regardless of the foregoing, a tread pattern with underlying blocks may be formed by segmenting the land portions 61-63 to form a plurality of segments in the circumferential direction of the tire (not shown in the figures).

Furthermore, the land portions 61-63 may have lug grooves (for example, a lateral groove with a groove width of approximately 5 mm and a shallow groove depth) (not shown in the figures). With this construction, the rigidity of the land portions 61-63 is suitably ensured by the shallow lug grooves, and there is an advantage that the water displacing performance is enhanced during wet condition driving. Note, with this construction, the lug groove of the contact patch is blocked when the tire is in contact with the ground, and the land portions in the contact patch are contiguous in the circumferential direction of the tire.

[Performance Tests]

In this embodiment, performance tests for uneven-wear resistance were performed on a plurality of pneumatic tires under different conditions (see FIG. 3). In each of the performance tests, pneumatic tires with a tire size of 11R22.5 are mounted on JATMA defined application rims, and two pneumatic tires are attached to the steering axle of a 2-door test vehicle. Moreover, the JATMA defined maximum inner pressure and maximum load are applied to these pneumatic tires.

After running the test vehicle on a paved road for 50,000 km, the amount of uneven wear of the shoulder ribs is checked, and an index evaluation is performed. In this evaluation, the comparative examples are set as the standard (100) and larger numeric values are preferable.

Each of the pneumatic tires 1 of Invention examples 1 to 10 are made with an appropriate ratio t/b, where t is the distance from the equatorial plane CL of the tire to the outer circumferential main grooves 52 and b is the distance from the equatorial plane of the tire CL to the inner edge of belt edge cushion 35 in the tire width direction; an appropriate ratio d/u, where d is half the width of the belt ply 33 with the largest width and u is the distance from the equatorial plane CL of the tire to narrow grooves 53; and an appropriate ratio a/t, where a is half the distance of the belt ply 31 in the outermost layer and t is the abovementioned distance (see FIG. 1).

As shown in the test results, the resistance to uneven wear of the each pneumatic tire 1 of Invention examples 1 to 10 showed improvement (see FIG. 3). Moreover, a comparison of Invention examples 2 to 4 shows that, because the positional relationship between each groove 52, 53 of the tread shoulder region and each belt ply 31 to 33 is made appropriate (ratio D1/D2 and ratio D2/D3), further improvement in the resistance to uneven wear of the tire is attained. Furthermore, a comparison of Invention examples 4 to 6 shows that, because the ratio G2/G1, where G1 is the groove depth of the outer circumferential main grooves 52 and G2 is the groove depth of the narrow grooves 53, is made appropriate, further improvement in the resistance to uneven wear of the tire is attained.

Furthermore, when invention example 6 and the invention example 7 are compared, it can be seen that the uneven wear resistance of the tire is further enhanced by optimizing the ratio t/b and the ratio d/u. Furthermore, when invention example 7 and invention example 8 are compared, it can be seen that the uneven wear resistance of the tire is further enhanced by optimizing the ratio a/t and also the ratio s/u between the distance s from the tire equatorial plane CL to the inside circumferential main groove 51 and the distance u from the tire equatorial plane CL to the narrow groove 53. Furthermore, when invention example 8 through invention example 10 are compared, it can be seen that the uneven wear resistance of the tire is further enhanced by optimizing the ratio D1/D2, the ratio D2/D3, and the ratio G2/G1.

INDUSTRIAL APPLICABILITY

As described above, the pneumatic tire according to the present invention is advantageous because the pneumatic tire has improved uneven-wear resistance.

EXPLANATIONS OF LETTERS OR NUMERALS

1 Pneumatic Tire
2 Carcass layer
3 Belt layer
4 Tread rubber
4 Invention example
6 Invention example
31 to 34 Belt plies
35 Belt edge cushion
51 Inner circumferential main grooves
52 Outer circumferential main grooves
53 Narrow groove
61, 62 Center ribs
63 Shoulder ribs
631 Narrow ribs

What is claimed is:

1. A pneumatic tire formed by laminating a plurality of belt plies, comprising:
a belt layer arranged on an outer side of a carcass layer in a radial direction of the pneumatic tire;
a belt edge cushion arranged on an edge of the belt plies;
at least four circumferential main grooves in a tread of the pneumatic tire extending in the radial direction of the pneumatic tire forming and partitioning a plurality of land portions, and further comprising narrow grooves forming narrow ribs on an edge of an outer side of the land portions in a width direction of the tire and arranged on a tread shoulder area land portion;
wherein the at least four circumferential main grooves comprise outer circumferential main grooves located on edge sides of a footprint of the pneumatic tire; and
wherein a cross-section of the pneumatic tire in a tire meridian direction comprises:
a distance t from a tire equatorial plane to the outer circumferential main grooves and a distance b from the tire equatorial plane to the edge of an inner side of the belt edge cushion in the tire width direction such that that $0.85 \leq t/b \leq 0.90$ is satisfied;
a width d comprising half the width of a largest width belt ply, and a distance u extending from the tire equatorial plane to the narrow grooves such that $0.97 \leq d/u \leq 1.03$ is satisfied; and
a width a comprising half the width of an outermost layer belt ply, and the distance t, such that $1.15 \leq a/t \leq 1.25$ is satisfied.

2. A pneumatic tire in accordance with claim 1, the at least four circumferential main grooves further comprising inner circumferential main grooves located near the tire equatorial plane, and wherein a relationship between a distance s from the equatorial plane of the tire to the inner circumferential main grooves and the distance u from the tire equatorial plane to the narrow grooves satisfies $0.18 \leq s/u \leq 0.20$.

3. A pneumatic tire in accordance with claim 2, wherein the relationship between the distance t of the outer circumferential main grooves and the distance u of the narrow grooves satisfies $0.55 \leq t/u \leq 0.60$.

4. A pneumatic tire in accordance with claim 3, the plurality of belt plies further comprising intermediate belt plies arranged between the belt plies in the outermost layer and the belt plies having the largest width, and wherein a distance D1 from an outer circumferential main groove floor of the outer circumferential main grooves to the belt plies in the outermost layer, a distance D2 from a narrow groove floor of the narrow grooves to an edge of the intermediate belt plies on the outer side in the tire width direction, and a distance D3 from the groove floor of the narrow grooves to the belt plies that have the largest width, satisfy $0.35 \leq D1/D2 \leq 0.40$ and $0.85 \leq D2/D3 \leq 1.00$.

5. A pneumatic tire in accordance with claim 4, wherein a relationship between a groove depth G1 of the outer circumferential main grooves and a groove depth G2 of the narrow grooves satisfies $0.80 \leq G2/G1 \leq 1.00$.

6. A pneumatic tire in accordance with claim 5, wherein a center part of the land portion in the tread shoulder area is sipeless.

7. A pneumatic tire in accordance with claim 6, wherein the pneumatic tire comprises a heavy duty pneumatic tire.

8. A pneumatic tire in accordance with claim 1, the plurality of belt plies further comprising intermediate belt plies arranged between the belt plies in the outermost layer and the belt plies having the largest width, and wherein a distance D1 from an outer circumferential main groove floor of the outer circumferential main grooves to the belt plies in the outermost layer, a distance D2 from a narrow groove floor of the narrow grooves to an edge of the intermediate belt plies on the outer side in the tire width direction, and a distance D3 from the groove floor of the narrow grooves to the belt plies that have the largest width, satisfy $0.35 \leq D1/D2 \leq 0.40$ and $0.85 \leq D2/D3 \leq 1.00$.

9. A pneumatic tire in accordance with claim 1, wherein the relationship between the distance t of the outer circumferential main grooves and the distance u of the narrow grooves satisfies $0.55 \leq t/u \leq 0.60$.

10. A pneumatic tire in accordance with claim 1, the plurality of belt plies further comprising intermediate belt plies arranged between the belt plies in the outermost layer and the belt plies having the largest width, and wherein a distance D1 from an outer circumferential main groove floor of the outer circumferential main grooves to the belt plies in the outermost layer, a distance D2 from a narrow groove floor of the narrow grooves to an edge of the intermediate belt plies on the outer side in the tire width direction, and a distance D3 from the groove floor of the narrow grooves to the belt plies that have the largest width, satisfy $0.35 \leq D1/D2 \leq 0.40$ and $0.85 \leq D2/D3 \leq 1.00$.

11. A pneumatic tire in accordance with claim 1, wherein a relationship between a groove depth G1 of the outer circumferential main grooves and a groove depth G2 of the narrow grooves satisfies $0.80 \leq G2/G1 \leq 1.00$.

12. A pneumatic tire in accordance with claim 1, wherein a center part of the land portion in the tread shoulder area is sipeless.

13. A pneumatic tire in accordance with claim 1, wherein the pneumatic tire comprises a heavy duty pneumatic tire.

14. A pneumatic tire, comprising:
a plurality of belt plies comprising intermediate belt plies arranged between outermost belt plies and large width belt plies;
a belt layer arranged on an outer side of a carcass layer in a radial direction of the pneumatic tire;
a belt edge cushion arranged on an edge of the belt plies;
at least two inner circumferential main grooves and at least two outer circumferential main grooves in a tread of the pneumatic tire extending in the radial direction of the pneumatic tire forming and partitioning a plurality of land portions;
narrow grooves forming narrow ribs on an edge of an outer side of the land portions in a width direction of the tire and arranged on a tread shoulder area land portion;
wherein the at least four circumferential main grooves comprise outer circumferential main grooves located on edge sides of a footprint of the pneumatic tire; and
wherein a cross-section of the pneumatic tire in a tire meridian direction comprises:
a distance t from a tire equatorial plane to the outer circumferential main grooves and a distance b from the tire equatorial plane to the edge of an inner side of the belt edge cushion in the tire width direction such that that $0.85 \leq t/b \leq 0.90$ is satisfied;
a width d comprising half the width of a largest width belt ply, and a distance u extending from the tire equatorial plane to the narrow grooves such that $0.97 \leq d/u \leq 1.03$ is satisfied;
a width a comprising half the width of an outermost layer belt ply, and the distance t, such that $1.15 \leq a/t \leq 1.25$ is satisfied; and
a distance s from the equatorial plane of the tire to the inner circumferential main grooves and the distance a such that $0.18 \leq s/u \leq 0.20$ is satisfied.

15. A pneumatic tire in accordance with claim 14, wherein a distance D1 from an outer circumferential main groove floor of the outer circumferential main grooves to the belt plies in the outermost layer, a distance D2 from a narrow groove floor of the narrow grooves to an edge of the intermediate belt plies on the outer side in the tire width direction, and a distance D3 from the groove floor of the narrow grooves to the belt plies that have the largest width, satisfy $0.35 \leq D1/D2 \leq 0.40$ and $0.85 \leq D2/D3 \leq 1.00$.

16. A pneumatic tire in accordance with claim 14, wherein the relationship between the distance t of the outer circumferential main grooves and the distance u of the narrow grooves satisfies $0.55 \leq t/u \leq 0.60$.

17. A pneumatic tire in accordance with claim 16, wherein a relationship between a groove depth G1 of the outer circumferential main grooves and a groove depth G2 of the narrow grooves satisfies $0.80 \leq G2/G1 \leq 1.00$.

18. A pneumatic tire in accordance with claim 14, wherein a relationship between a groove depth G1 of the outer circumferential main grooves and a groove depth G2 of the narrow grooves satisfies $0.80 \leq G2/G1 \leq 1.00$.

19. A pneumatic tire in accordance with claim 14, wherein a center part of the land portion in the tread shoulder area is sipeless.

20. A pneumatic tire in accordance with claim 14, wherein the pneumatic tire comprises a heavy duty pneumatic tire.

* * * * *